(12) United States Patent
Keeney

(10) Patent No.: US 6,369,895 B1
(45) Date of Patent: Apr. 9, 2002

(54) COLOR MEASUREMENT INSTRUMENT WITH ASYMMETRIC TAPERED SAMPLE AREA OPTICAL ENCLOSURE

(75) Inventor: Richard A. Keeney, Minneapolis, MN (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/505,642

(22) Filed: Feb. 16, 2000

(51) Int. Cl.$^7$ .................................................. G01J 3/51
(52) U.S. Cl. ...................... 356/419; 356/402; 356/416; 356/446
(58) Field of Search ................................ 356/326, 328, 356/300, 402, 403, 404, 405, 406, 407, 408, 416, 418, 419, 420, 425, 445, 446; D10/81

(56) References Cited

U.S. PATENT DOCUMENTS

| | | |
|---|---|---|
| 3,994,590 A | 11/1976 | DiMartini et al. |
| 4,553,033 A | 11/1985 | Hubble, III et al. ......... 356/445 |
| 4,678,338 A | 7/1987 | Kitta et al. .................. 356/402 |
| 4,947,348 A | 8/1990 | Van Arsdell |
| 4,949,400 A | 8/1990 | Leveen et al. ............... 356/420 |
| 5,015,098 A | 5/1991 | Berg et al. ................... 356/402 |
| 5,073,028 A | 12/1991 | Bowden et al. .............. 356/402 |
| 5,137,364 A | 8/1992 | McCarthy .................... 356/402 |
| 5,173,750 A | 12/1992 | Laukaitis ..................... 356/445 |
| 5,272,518 A | 12/1993 | Vincent ........................ 356/405 |
| 5,319,437 A | 6/1994 | Van Aken et al. ........... 356/326 |
| 5,373,364 A | 12/1994 | Krzyminski ................. 356/405 |
| 5,377,000 A | 12/1994 | Berends ........................ 356/73 |
| 5,483,339 A | 1/1996 | Van Aken et al. ........... 356/326 |
| 5,684,582 A | 11/1997 | Eastman et al. ............. 356/328 |
| 5,963,333 A | 10/1999 | Walowit et al. .............. 356/425 |

FOREIGN PATENT DOCUMENTS

DE 19633557 3/1998

OTHER PUBLICATIONS

Color Savvy Systems Limited letter to Management Graphics, dated Jan. 21, 1998 and enclosing Color Savvy Retail Price List valid through Dec. 1, 1997 (Two pages).
Complete Color Management From Pickup to Scan to Display to Print to View, Color Savvy Systems Limited (undated—indicates certain specifications subject to change without notice and valid through Dec. 1, 1996. This document is believed to have been forwarded to Management Graphics by Color Savvy Systems Limited with the Jan. 21, 1998 letter referenced above) (Ten pages).
Patent Abstracts of Japan, Abstract of Japanese Patent "Photodetecting Probe of Spectocolorimeter", Publication No. 62148819, Jul. 2, 1987.

*Primary Examiner*—F. L. Evans
(74) *Attorney, Agent, or Firm*—Barry R. Lipsitz; Douglas M. McAllister

(57) ABSTRACT

A color measurement instrument such as a reflection densitometer or a spectral reflectometer is fitted with an asymmetric tapered sample area optical enclosure to allow an improved operator sight line to the sample target area and allow ease of placement on the sample target, while allowing for the standard 45° illumination/90° measurement geometry. The disclosed structure is particularly suitable for use as a hand-held instrument.

21 Claims, 4 Drawing Sheets

COLOR MEASUREMENT INSTRUMENT WITH ASYMMETRIC TAPERED SAMPLE AREA OPTICAL ENCLOSURE

BACKGROUND OF THE INVENTION

The present invention relates to the field of instruments used to measure the reflective color of an object, such as a reflection densitometer or a spectral reflectometer. These types of instruments are used extensively in measuring printed ink colors, paint colors, or the colors of any other object for which a numerical color value is desired. In the case of printing devices, the measured values are often used to calibrate the printing device in a feedback loop so as to reproduce a desired color. In other cases, the measured value is used to specify a desired color in a digital image or document, often for the purpose of matching the color of the measured object.

Instruments of this type are well known in the prior art and are generally comprised of one or more light sources and one or more light sensitive detectors arranged in specific geometry. Under common standards (such as ANSI/ISO May 4, 1995 *Density Measurements—Part 4: Geometric Conditions for Reflection Density*, or DIN 16536 *Color Density Measurements on Prints: Requirements on Measuring Apparatus for Reflection Densitometers*), the measurement geometry is specified to consist of an annular ring of illumination projected onto the center of a sample target area at an angle of between 40 and 50 degrees. The light reflected off the sample is sensed by a detector positioned at an angle of between 85 and 90 degrees from the target sample. Alternatively, the positions of the light source and detector may be interchanged.

Detailed discussions relating to the background of color measurement instruments may be found in prior art such as U.S. Pat. Nos. 5,015,098 and 5,073,028.

Such measuring devices may also be configured as hand-held devices. Hand-held measuring devices used to measure the reflective color of an object are generally manually aimed by positioning a small (3 to 7 mm diameter) sampling aperture in contact with and over the area of the sample for which the color is to be measured. The manual aiming process can be tedious and error-prone due to the inability of the operator to accurately see where the sampling aperture of the measuring device is about to be placed on the sample. The enclosure of the measuring device is generally constrained by the measurement geometry requirements to taper away from the sampling aperture at an angle no greater than 40 degrees. Such a configuration significantly obstructs the operator's sight line during aiming and positioning of the sampling aperture over an area to be sampled.

For example, a typical prior art hand-held measuring device is illustrated in FIG. 1. FIG. 1 shows a prior art measuring device 100 having a sample area optical enclosure 101. The optical enclosure 101 includes light sources 120 and 121 arranged such that light is projected towards a sampling aperture 110 at an angle of 45 degrees. The detector 130 is arranged to detect light reflected at a surface normal to the sampling aperture 110. FIG. 1 shows the measuring device 100 positioned over a sample area 210 of a sample 200. The portion of the optical enclosure 101 which tapers down to form a sampling aperture 110 is formed by the optical enclosure walls 140 which narrow toward the sampling aperture in the shape of a cone. The cone shaped walls 140 are symmetrically arranged and angled at approximately 45 degrees. This angle of the walls 140 is constrained both by the placement of the light sources 120 and 121 so as to project light toward the sampling aperture 110 at an angle of 45 degrees and by the placement of the detector 130 so as to detect light reflected at a surface normal to the sampling aperture 110.

The geometry of the prior art measuring device 100 conforms to standard measurement geometry relating to placement of the light source and detector. As can be seen from FIG. 1, such a configuration results in the optical enclosure obstructing the view of the area to be sampled. The operator sight line, shown in FIG. 1 as 300, is angled at approximately 45 degrees from the targeted sample area. Such an obstructed sight line makes it extremely difficult for an operator to accurately position the measuring device 100 over the sample area, resulting in erroneous measurements.

A slight improvement over the prior art is illustrated by FIG. 2, which shows a hand-held measuring device such as that disclosed in U.S. Pat. No. 5,963,333. FIG. 2 shows the same elements as disclosed in FIG. 1 and all reference numbers correspond.

The prior art measuring device of FIG. 2 allows for a different configuration of the light sources 120 and 121, which results in a slightly improved operator sight line 300. The light sources 120 and 121 are positioned such that the light is projected onto reflective surfaces 142 of walls 140 proximal to the sampling aperture, which reflective surfaces reflect the light towards the sampling aperture at an angle of approximately 45 degrees. Such a configuration maintains the standard measurement geometry, while allowing the optical enclosure walls 140 to be arranged symmetrically and angled at approximately 60 degrees. As shown in FIG. 2, such an arrangement of the optical enclosure walls 140 allows for a slightly improved operator sight line 300 of approximately 60 degrees.

While the sight line of the measuring device illustrated in FIG. 2 is an improvement over that of FIG. 1, such a configuration still results in an obstructed view of the area to be sampled and results in difficulty in accurately positioning the sampling aperture over the sample area. The sight line of approximately 60 degrees is less than optimal.

An operator sight line approaching the optimal 90 degrees is desired and is accomplished by the present invention.

SUMMARY OF THE INVENTION

The present invention is intended to eliminate the problems associated with the restricted sight line of the prior art color measurement instruments such as reflection densitometers or spectral reflectometers. The object of the present invention is accomplished by arranging the light source and detector in a manner which allows the sample area optical enclosure walls to taper away from the sampling aperture in an asymmetrical manner. The taper angle of the optical enclosure is higher at the front of the optical enclosure where the operator requires a better sight line, while the taper angle of the optical enclosure walls at the portions towards the rear of the optical enclosure is approximately 40 degrees. Such a configuration allows for the standard measurement geometry between the detector and sample of approximately 90 degrees and between the light source and sample of approximately 45 degrees. The asymmetrical configuration of the optical enclosure allows for an operator sight line of approximately 80 degrees.

The light source can comprise, for example, one or more incandescent light sources, one or more infrared light sources, one or more light emitting diodes, or the like. Similarly, the detector can comprise, for example, one or more detectors or series of detectors, a detector with a multitude of detection elements, or the like.

In one embodiment of the present invention, the light source is positioned only towards the rear of the optical enclosure. As light is projected into the sampling aperture from only one position, such a configuration provides illumination of the sample area that is not completely in adherence with standard measurement techniques, such as the American National Standards Institute (ANSI) standard (ANSI/ISO May 4, 1995). However, the measurements achieved are sufficiently accurate for most applications. Only in the case of heavily textured sample surfaces would the orientation of illumination become significant, and only where the textured sample is significantly directional in its arrangement.

In another embodiment of the invention, a first light source is positioned towards the rear of the optical enclosure and illuminates the sampling aperture directly at an angle of projection of approximately 45 degrees. A second light source is positioned toward the rear of the optical enclosure and projects light onto a reflective surface proximal to the front of the sampling aperture, which reflecting surface is arranged such that the light from the light source is projected into the sampling aperture at an angle of approximately 45 degrees. Such a configuration maintains the standard measurement geometry and conforms to measurement standards, while allowing the operator an improved sight line for placement of the sampling aperture over the area to be sampled. As with the previously described embodiment, the operator sight line in such a configuration is approximately 80 degrees.

Alternatively, a single light source can be positioned at the rear of the optical enclosure such that it directs light both directly into the sampling aperture at an angle of 45 degrees and at the reflective surface proximal to the front of the sampling aperture, from which the light is reflected into the sampling aperture at approximately 45 degrees.

In another embodiment of the invention, the optical enclosure comprises an outer cone and an inner cone. The inner cone acts to maximize the transmission of light reflected off of a sample to the detector. The interior surface of the inner cone may comprise a non-reflective surface for maximizing light transferred from the sample to the detector.

In a preferred embodiment the optical enclosure forms part of a hand-held measuring device such as a hand-held reflection densitometer or a hand-held spectral reflectometer which can be manually positioned over the object to be sampled.

DETAILED DESCRIPTION OF THE INVENTION

Figure 1:
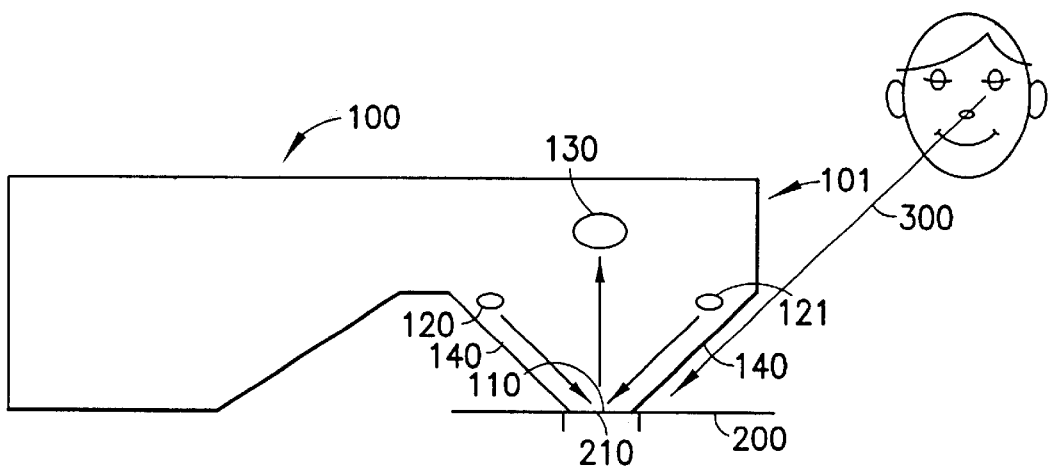
FIG. 1 is a cross-sectional view of a reflective color measuring device known in the prior art having a symmetrical optical enclosure configuration and a light source and detector arranged in conventional measuring geometry.
Figure 2:
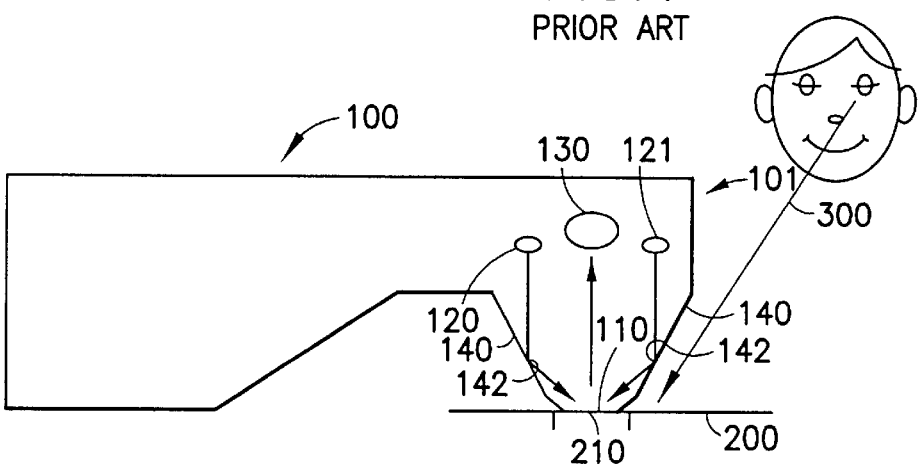
FIG. 2 is a cross-sectional view of a reflective color measuring device known in the prior art having a symmetrical optical enclosure configuration and using a reflective surface proximal to the sampling aperture to obtain conventional measuring geometry.
Figure 3:
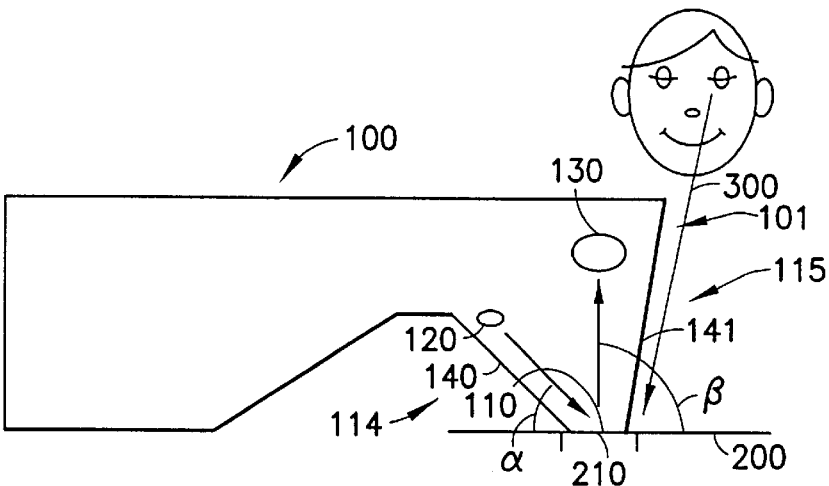
FIG. 3 is a cross-sectional view of an exemplary embodiment of the present invention having an asymmetrical optical enclosure configuration.

FIG. 3 discloses an embodiment of the invention in which a color measuring instrument 100 has a sample area optical enclosure 101. The optical enclosure 101 has a rear portion 114 and a front portion 115. The optical enclosure 101 includes a light source 120 arranged only toward a rear portion 114 of the optical enclosure.

A circular sampling aperture 110 is shown positioned over a sample area 210 of a sample 200. It is noted that in all of the embodiments of the invention, sampling apertures of other shapes can be used instead of the circular aperture depicted in the drawings. The light source 120 is arranged such that light is projected towards the sampling aperture 110 at an angle α of 45 degrees. A detector 130 is positioned to measure light reflected from the sample 200 at an angle β of 90 degrees.

The portion of the optical enclosure 101 which tapers down to form the sampling aperture 110 is formed by an optical enclosure rear wall 140 and an optical enclosure front wall 141 which narrow asymmetrically toward the sampling aperture in the general shape of a cone. The walls 140 and 141 taper towards the sampling aperture and are asymmetrically arranged such that the rear wall 140 is angled at approximately 40 degrees and the front wall 141 is angled at approximately 80 degrees. Thus the taper angle of the optical enclosure is greater at the front portion 115 of the optical enclosure where the operator requires a better sight line. Such a configuration of the optical enclosure walls 140 and 141 provide a relatively unobstructed view of the targeted sample area 210. The operator sight line 300 is approximately 80 degrees from the targeted sample area 210.

In this embodiment, the light source 120 is positioned only towards the rear portion 114 of the optical enclosure and projects light into the sampling aperture at an angle α of 45 degrees. As light is projected into the sampling aperture from only one position, such a configuration provides illumination of the sample area 210 that does not completely adhere to standard measurement techniques, such as the ANSI standard. However, the measurements achieved are sufficiently accurate for most applications. Only in the case of heavily textured sample surfaces would the orientation of illumination become significant, and only where the textured sample is significantly directional in its arrangement.

Figure 6:
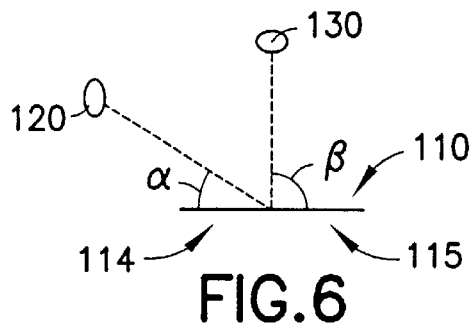
FIG. 6 is a side view of the sampling aperture and the respective angles of illumination and detection.

FIG. 6 illustrates the relative positioning of the light source 120 and the detector 130 with respect to the sampling aperture 110. In the foregoing embodiment, the light source 120 is positioned only toward the rear portion 114 of the optical enclosure and projects light toward the sampling area 110 at an angle α of 45 degrees. The detector 130 is positioned to detect light reflected off a sample at an angle β of 90 degrees.

Figure 7:
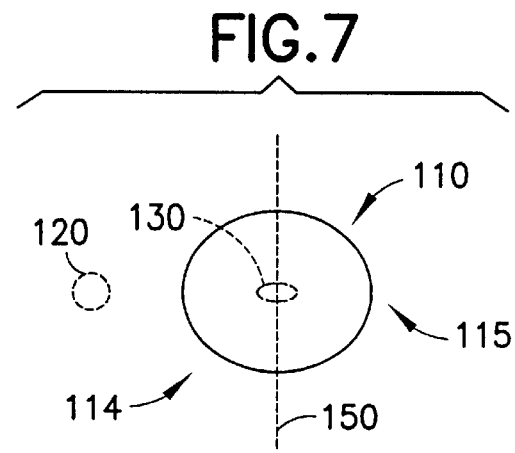
FIG. 7 is a bottom view of the sampling aperture with positioning of the light source and detector.

FIG. 7 shows the sampling aperture 110 from a bottom view, with the positioning of the light source 120 and detector 130 in perspective. The sampling aperture 110 is shown with a center line 150 dividing the front portion 115 and rear portion 114 of the optical enclosure.

FIGS. 6 and 7 are intended only to show the relative relationship between the angle of illumination α and angle of detection α with respect to the sampling aperture 110. The exact positioning of the light source and detector can vary in a particular embodiment of the invention. In addition, the positions of the detector and light source may be interchanged in any given embodiment.

Additionally, the light source 120 can comprise, for example, one or more incandescent light sources, one or more infrared light sources, one or more light emitting diodes, or the like.

Similarly, the detector 130 can comprise, for example, one or more detectors or series of detectors, a detector with a multitude of detection elements, or the like.

Figure 4:
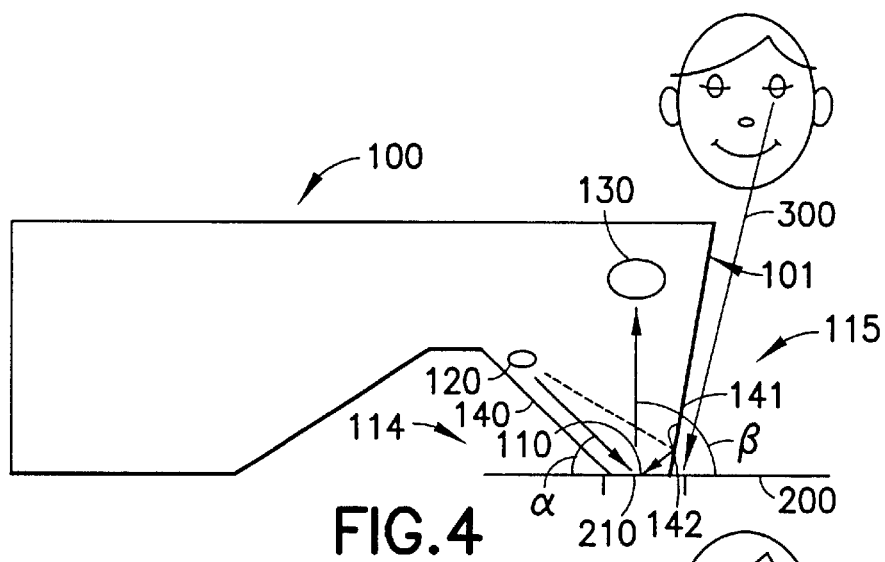
FIG. 4 is a cross-sectional view of a second exemplary embodiment of the present invention having an asymmetrical optical enclosure configuration.

In another embodiment of the invention as shown in FIG. 4, the optical enclosure 101 includes a light source 120 arranged toward a rear portion 114 of the optical enclosure 101. The light source 120 is positioned so that it illuminates a sampling aperture 110 directly at an angle of projection α of approximately 45 degrees. The light source 120 also projects light onto a reflective surface 142 proximal to the front of the sampling aperture, which reflecting surface 142 is arranged such that the light from the light source 120 is projected by the reflecting surface 142 into the sampling aperture 110 at an angle α of approximately 45 degrees. A detector 130 is positioned to detect light reflected normal to the sampling aperture 110.

The sampling aperture 110 is shown positioned over a sample area 210 of a sample 200. The portion of the optical enclosure 101 which tapers down to form the sampling aperture 110 is formed by an optical enclosure rear wall 140 and an optical enclosure front wall 141 which narrow asymmetrically toward the sampling aperture in the general shape of a cone. The walls 140 and 141 taper towards the sampling aperture and are asymmetrically arranged such that the rear wall 140 is angled at approximately 40 degrees and the front wall 141 is angled at approximately 80 degrees. Thus the taper angle of the optical enclosure is greater at the front portion 115 of the optical enclosure where the operator requires a better sight line. Such a configuration of the optical enclosure walls 140 and 141 provide a relatively unobstructed view of the targeted sample area 210.

Such a configuration maintains the standard measurement geometry and conforms to measurement standards, while allowing the operator an improved sight line for placement of the sampling aperture over the area to be sampled. The operator sight line 300 in such a configuration is approximately 80 degrees from the targeted sample area 210.

Figure 5:
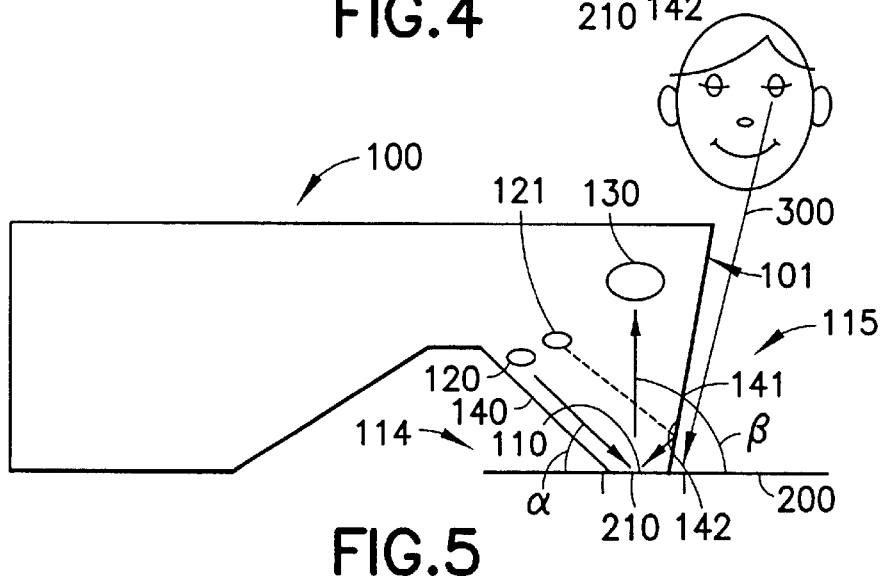
FIG. 5 is a cross-sectional view of a third exemplary embodiment of the present invention having an asymmetrical optical enclosure configuration.

In another embodiment of the invention as shown in FIG. 5, the optical enclosure 101 includes a first light source 120 arranged toward a rear portion 114 of the optical enclosure 101. The light source 120 is positioned so that it illuminates a sampling aperture 110 directly at an angle of projection α of approximately 45 degrees. A second light source 121 arranged toward the rear portion 114 of the optical enclosure projects light onto a reflective surface 142 proximal to the front of the sampling aperture, which reflecting surface 142 is arranged such that the light from the light source 121 is projected by the reflecting surface 142 into the sampling aperture 110 at an angle of approximately 45 degrees. A detector 130 is positioned to detect light reflected normal to the sampling aperture 110.

Such a configuration maintains the standard measurement geometry and conforms to measurement standards, while allowing the operator an improved sight line for placement of the sampling aperture over the area to be sampled. The operator sight line in such a configuration is approximately 80 degrees.

Figure 8:
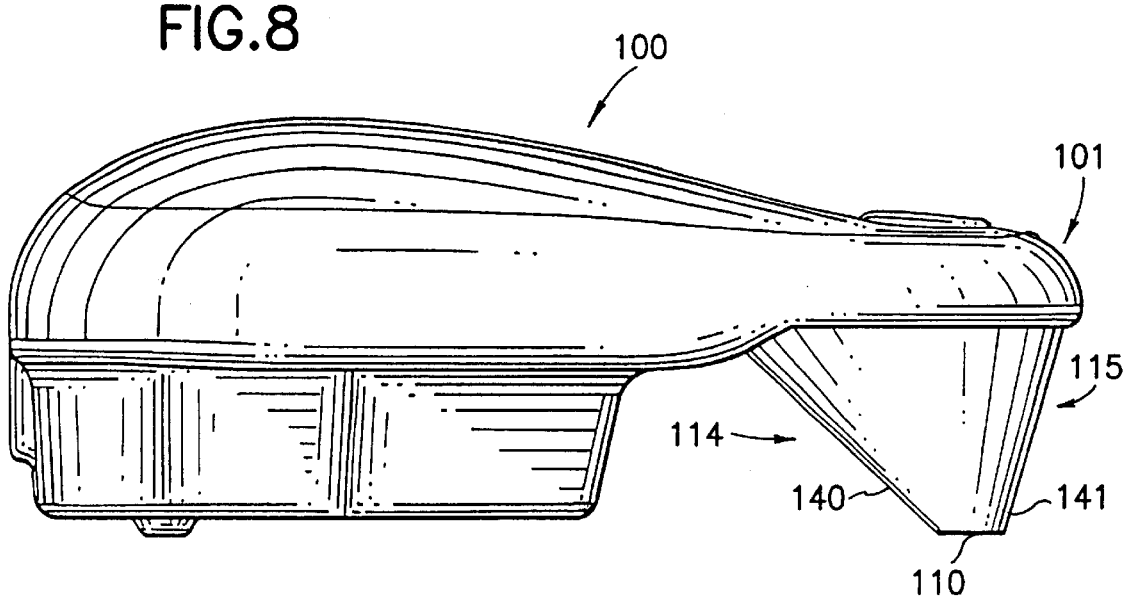
FIG. 8 is a side view exterior illustration of a hand-held measuring device.

In another embodiment of the invention, the optical enclosure forms part of a hand-held measuring device such as a hand-held reflection densitometer or a hand-held spectral reflectometer which can be manually positioned over the object to be sampled. FIG. 8 shows a side view exterior illustration of such a hand-held measuring device 100. The optical enclosure 101 of the hand-held measuring device is configured as in the previously discussed embodiments. In particular, the optical enclosure 101 has an optical enclosure front wall 141 and an optical enclosure rear wall 140 which taper towards the sampling aperture 110 in the general shape of a cone. The walls 140 and 141 are asymmetrically arranged such that the rear wall 140 is angled at approximately 40 degrees and the front wall 141 is angled at approximately 80 degrees. The asymmetrical configuration of the walls can be seen in FIG. 8 as providing a operator sight line toward the sample area of approximately 80 degrees.

The arrangement of the light source and detector as described in any embodiment of the invention may be used in such a hand-held configuration.

Additionally, the exterior of the optical enclosure proximal to the sampling aperture may be configured to function as a guide to aid the placement of the sampling aperture over the object to be measured.

Figure 9:
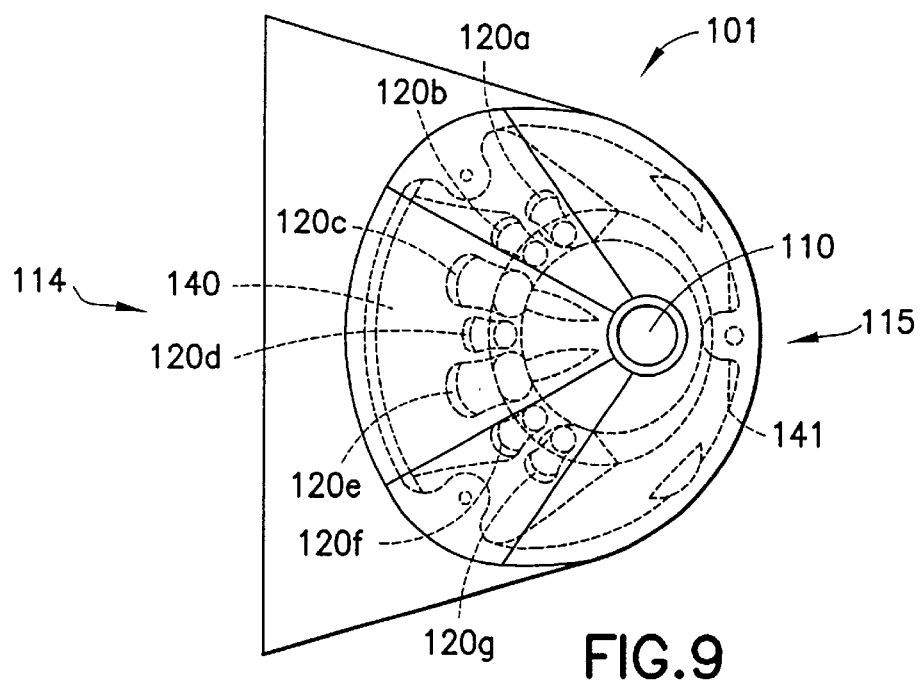
FIG. 9 is a bottom view of the optical enclosure for a particular embodiment.

A further embodiment of the present invention as shown in FIG. 9 uses a series of light emitting diodes (LEDs) as the light source 120 arranged toward the rear portion 114 of the optical enclosure. FIG. 9 shows a bottom view of the optical enclosure 101 with the optical enclosure rear wall 140 and optical enclosure front wall 141. In this embodiment, the series of LEDs 120a, 120b, 120c, 120d, 120e, 120f and 120g are a combination of red, green, and blue LEDs which are focused to provide a white spectrum for illumination of the sampling aperture 110. The number, type, size and arrangement of the LEDs may vary in a particular embodiment. As in the previous embodiments, the optical enclosure walls 140 and 141 taper asymmetrically to allow a substantially improved operator sight line.

Figure 10:
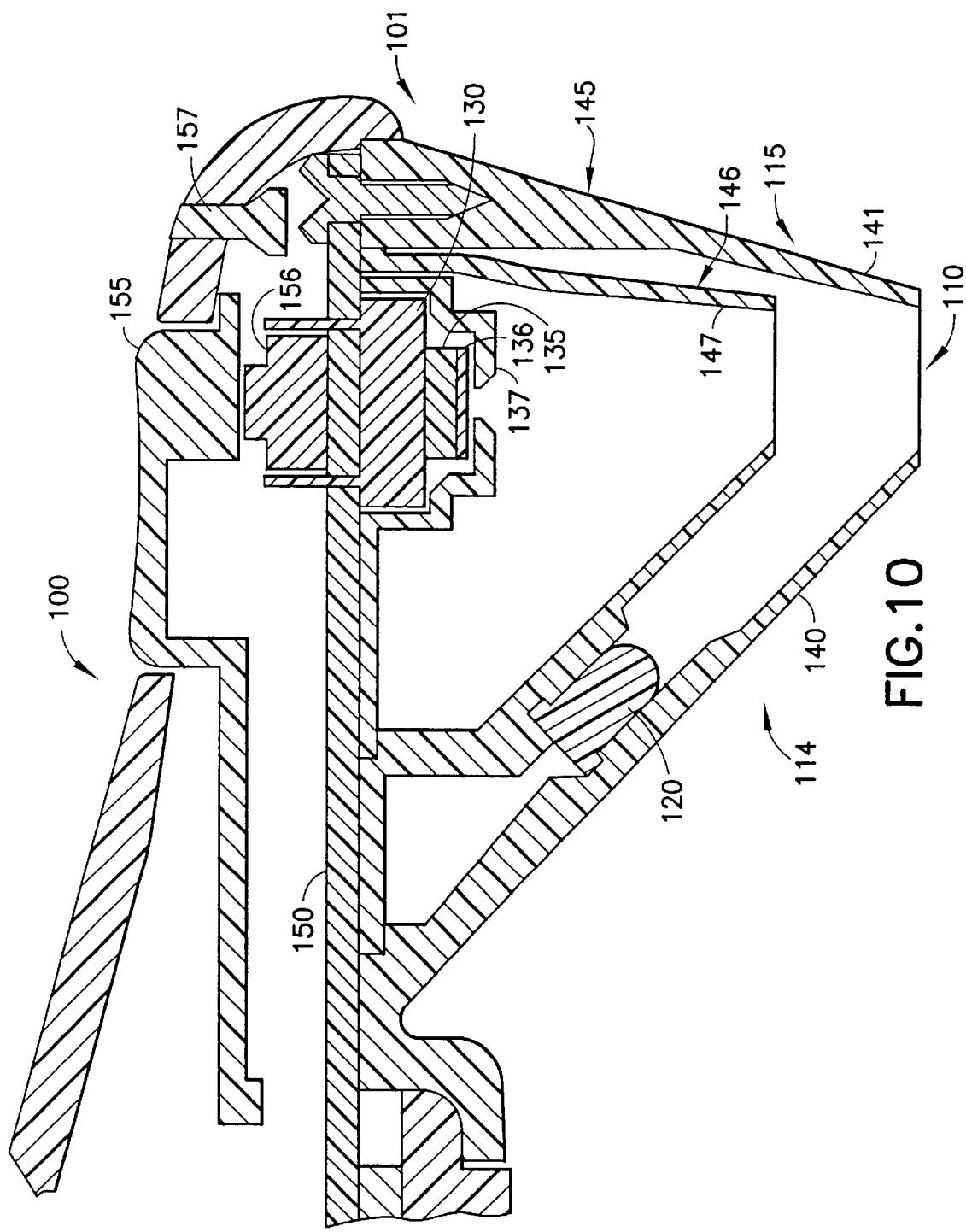
FIG. 10 is a side view of the optical enclosure shown in FIG. 9.

FIG. 10 is a cross-sectional view of a further embodiment. Light source 120 arranged toward the rear 114 of the optical enclosure 101 projects light into the sampling aperture 110 at an angle of 45 degrees. In this view the detector 130 is shown affixed to a printed circuit board 150 directly above the sampling aperture 110. The detector 130 in this particular embodiment comprises a series of detection elements (such as the TSL1402 256×1 Linear Sensor Array with Hold made by Texas Advanced Optoelectronic Solutions, Inc. of Plano, Tex.) positioned behind a linear variable filter 135 which separately filters light impinging upon each detector element to enable different detector elements to detect different wavelengths. Such filters are available, for example, as the LVF400-700 or LVF400-700NB Selectraband Linear Variable Filters made by OCLI of Santa Rosa, Calif. The linear variable filter 135 is shown behind an infrared filter 136 and a light shield 137.

In this particular embodiment, the optical enclosure rear wall 140 and the optical enclosure front wall 141 form an outer cone 145. An inner cone 146 is provided to maximize the transmission of the light reflected off of a sample to the detector 130. The interior of the inner cone 146 consists preferably of a non-reflective surface 147 for maximizing light transmitted from the sample to the detector 130.

Also shown in FIG. 10 is a button 155 for activation of a switch 156, which operates the measuring device 100. A busy light 157 is provided which signals when the measuring device is in operation.

As shown in FIG. 10, such a configuration allows for the optical enclosure walls 140 and 141 to taper asymmetrically away from the sampling aperture, thereby providing the operator with an improved sight line toward the area to be sampled of approximately 80 degrees.

It will now be appreciated that the present invention provides an improved optical enclosure for use in measuring the reflective qualities of samples, wherein the operator sight line toward the area to be sampled is greatly improved by providing an asymmetrically shaped sample area optical enclosure.

Although the invention has been described in connection with preferred embodiments thereof, those skilled in the art will appreciate that numerous adaptations and modifications may be made thereto without departing from the spirit and scope of the invention, as set forth in the following claims.

What is claimed is:

1. An optical enclosure for use in measuring light reflected off a sample area comprising:
   optical enclosure walls which taper to form a sampling aperture; and
   a light source and a detector arranged within the optical enclosure in a configuration which allows the optical enclosure walls to taper away from the sampling aperture in an asymmetrical manner.

2. An optical enclosure as claimed in claim 1, wherein the optical enclosure forms part of a hand-held device for measuring the reflective color of a sample area.

3. An optical enclosure as claimed in claim 2, wherein the sampling aperture is adapted to be manually positioned over the area of a sample for which the color is to be measured.

4. An optical enclosure as claimed in claim 1, wherein the optical enclosure forms part of a reflection densitometer.

5. An optical enclosure as claimed in claim 1, wherein the optical enclosure forms part of a color reflection densitometer.

6. An optical enclosure as claimed in claim 1, wherein the optical enclosure forms part of a spectral reflectometer.

7. An optical enclosure as claimed in claim 1, wherein the exterior of the optical enclosure proximal to the front of the sampling aperture functions as a guide to aid the placement of the sampling aperture over the sample area to be measured.

8. An optical enclosure as claimed in claim 1, wherein the optical enclosure comprises:
   a light source arranged only toward a rear portion of the optical enclosure which projects light into the sampling aperture at an angle of approximately 45 degrees;
   a detector arranged to detect light reflected at a surface normal to the sampling aperture; and
   an optical enclosure rear wall and an optical enclosure front wall which taper toward the sampling aperture in the general shape of a cone and are asymmetrically arranged such that the rear wall is angled at approximately 40 degrees and the front wall is angled at approximately 80 degrees to form an optical enclosure which provides an operator sight line of approximately 80 degrees.

9. An optical enclosure as claimed in claim 1, wherein the interior of the optical enclosure wall proximal to the front of the sampling aperture comprises a reflective surface which reflects light from the light source into the sampling aperture at an angle of approximately 45 degrees.

10. An optical enclosure as claimed in claim 1, wherein the optical enclosure comprises:
    an optical enclosure rear wall and an optical enclosure front wall;
    a light source arranged toward a rear portion of the optical enclosure and aimed to both provide illumination directly into the sampling aperture at an angle of approximately 45 degrees and to provide illumination toward a reflective surface of the optical enclosure front wall proximal to the front of the sampling aperture, which reflective surface acts to reflect the illumination into the sampling aperture at an angle of approximately 45 degrees; and
    a detector arranged to detect light reflected at a surface normal to the sampling aperture;
    wherein the optical enclosure rear wall and the optical enclosure front wall taper toward the sampling aperture in the general shape of a cone and are asymmetrically arranged such that the rear wall is angled at approximately 40 degrees and the front wall is angled at approximately 80 degrees to form an optical enclosure which provides an operator sight line of approximately 80 degrees.

11. An optical enclosure as claimed in claim 1, wherein the optical enclosure comprises:
    an optical enclosure rear wall and an optical enclosure front wall;
    a first light source arranged toward a rear portion of the optical enclosure and aimed to provide illumination directly into the sampling aperture at an angle of approximately 45 degrees;
    a second light source arranged toward a rear portion of the optical enclosure and aimed to provide illumination toward a reflective surface of the optical enclosure front wall proximal to the front of the sampling aperture, which reflective surface acts to reflect the illumination into the sampling aperture at an angle of approximately 45 degrees; and
    a detector arranged to detect light reflected at a surface normal to the sampling aperture;
    wherein the optical enclosure rear wall and the optical enclosure front wall taper toward the sampling aperture in the general shape of a cone and are asymmetrically arranged such that the rear wall is angled at approximately 40 degrees and the front wall is angled at approximately 80 degrees to form an optical enclosure which provides an operator sight line of approximately 80 degrees.

12. An optical enclosure as claimed in claim 1, wherein the light source comprises a series of light emitting diodes configured so as to project substantially white light into the sampling aperture.

13. An optical enclosure as claimed in claim 1, wherein the detector comprises a series of detector elements positioned behind a linear variable filter which separately filters light impinging upon each detector element to enable different detectors to detect different wavelengths.

14. An optical enclosure for use in a hand-held instrument for measuring light reflected off a sample area which comprises:
    an optical enclosure rear wall and an optical enclosure front wall;
    a light source arranged at a rear portion of the optical enclosure and aimed to both provide illumination directly towards the sampling aperture at an angle of approximately 45 degrees and to provide illumination toward a reflective surface of the optical enclosure front wall proximal to the front of the sampling aperture, which reflective surface acts to reflect the illumination into the sampling aperture at an angle of approximately 45 degrees; and a detector arranged to detect light reflected at a surface normal to the sampling aperture;

wherein the optical enclosure rear wall and the optical enclosure front wall taper toward the sampling aperture in the general shape of a cone and are asymmetrically arranged such that the rear wall is angled at approximately 40 degrees and the front wall is angled at approximately 80 degrees to form an optical enclosure which provides an operator sight line of approximately 80 degrees.

15. A hand-held instrument as claimed in claim 14, wherein the hand-held instrument is a reflection densitometer.

16. A hand-held instrument as claimed in claim 14, wherein the hand-held instrument is a color reflection densitometer.

17. A hand-held instrument as claimed in claim 14, wherein the hand-held instrument is a spectral reflectometer.

18. A hand-held instrument as claimed in claim 14, wherein the exterior of the optical enclosure proximal to the front of the sampling aperture functions as a guide to aid the placement of the sampling aperture over the sample area to be measured.

19. A hand-held instrument as claimed in claim 14, wherein said light source comprises a series of light emitting diodes arranged only at said rear portion the optical enclosure to provide, in combination, substantially white light.

20. A hand-held instrument as claimed in claim 14, wherein the detector comprises a series of detector elements positioned behind a linear variable filter which separately filters light impinging upon each detector element to enable different detectors to detect different wavelengths.

21. A hand-held instrument as claimed in claim 14, wherein the optical enclosure comprises:

an asymmetrical optical enclosure outer cone formed by the optical enclosure rear wall and the optical enclosure front wall; and an inner cone situated within the outer cone and arranged substantially coaxial with the outer cone, said inner cone having a generally non-reflective inner surface for maximizing light transmitted from the sample surface to the detector.

* * * * *